United States Patent [19]

Berryhill

[11] Patent Number: 5,500,832
[45] Date of Patent: Mar. 19, 1996

[54] METHOD OF PROCESSING SEISMIC DATA FOR MIGRATION

[75] Inventor: John R. Berryhill, Austin, Tex.

[73] Assignee: Exxon Production Research Company, Houston, Tex.

[21] Appl. No.: 135,808

[22] Filed: Oct. 13, 1993

[51] Int. Cl.$^6$ ............................... G01V 1/28; G01V 1/36
[52] U.S. Cl. ............................... 367/51; 367/50; 367/53; 367/54; 367/74
[58] Field of Search ............................... 367/50, 51, 53, 367/54, 63, 74; 364/421; 128/660.07

[56] References Cited

U.S. PATENT DOCUMENTS

| | | | |
|---|---|---|---|
| 3,681,748 | 8/1972 | Diltz . | |
| 4,479,205 | 10/1984 | Gray . | |
| 4,503,527 | 3/1985 | Pann . | |
| 4,596,005 | 6/1986 | Frasier | 367/38 |
| 4,597,066 | 6/1986 | Frasier | 364/421 |
| 4,742,497 | 5/1988 | Beasley et al. . | |
| 4,797,861 | 1/1989 | Beasley | 367/50 |
| 4,803,668 | 2/1989 | Berryhill et al. . | |
| 4,813,027 | 3/1989 | Tieman . | |
| 4,839,869 | 6/1989 | Corcoran | 367/53 |
| 4,907,205 | 3/1990 | Yanchak . | |
| 4,964,089 | 10/1990 | Wang et al. | 367/51 |
| 4,980,866 | 12/1990 | Wang et al. . | |
| 4,984,220 | 1/1991 | Bodine et al. | 367/68 |
| 5,008,861 | 4/1991 | Gallagher | 364/421 |
| 5,062,086 | 10/1991 | Harlan et al. . | |
| 5,097,452 | 3/1992 | Beasley . | |
| 5,136,550 | 8/1992 | Chambers | 367/38 |
| 5,197,039 | 3/1993 | Corcoran et al. | 367/52 |

OTHER PUBLICATIONS

Luh, P. C. "True–Amplitude Signal Recovery" Society of Exploration Geophysicists, 61st Annual International Meeting & Exposition, Houston, Nov. 10–14, 1991, Expanded Abstracts of the Technical Program with Authors' Biographies, vol. II, pp. 1443–1447.

Stickland, P., Beresford, G. and Mair, D. "Improving Velocity Analysis beneath a Submarine Canyon using Velocity Re–datuming" The Bulletin of the Australian Society of Exploration Gephysicists, vol. 22, No. 4, Dec., 1991, pp. 583–589.

Larner, K. and Hale, D. "Dip–Moveout Error in Transversely Isotropic Media with Linear Velocity" Society of Exploration Geophysicists, 62nd Annual International Meeting & Exposition, New Orleans, Oct. 25–29, 1992, Technical Program Expanded Abstracts with Authors' Biographies, pp. 979–983.

Fokkema, J. T., Vercruijsse, P. A., van den Berg, P. M. and de Oliveira, A. S. "Seismic Inversion by rms Stacking on CMP Gathers" Society of Exploration Geophysicists, 59th Annual International Meeting & Exposition, Dallas, Oct. 29–Nov. 2, 1989, Expanded Abstracts of the Technical Program with Authors' Biographies, vol. II, pp. 992–995.

Stolt, R. H. "Migration by Fourier Transform" *Geophysics,* vol. 43, No. 1, Feb., 1978, pp. 23–48.

Schneider, W. A. "Integral Formulation for Migration in Two and Three Dimensions" *Geophysics,* vol. 43, No. 1, Feb., 1978, pp. 49–76.

Gazdag, J. "Wave Equation Migration with the Phase–Shift Method" *Geophysics,* vol. 43, No. 7, Dec., 1978, pp. 1342–1351.

Ottolini, R. A. "Migration of Reflection Seismic Data in Angle–midpoint Coorinates" Dissertation, Dept. of Geo (List continued on next page.)

*Primary Examiner*—Nelson Moskowitz
*Attorney, Agent, or Firm*—E. Richard Zamecki

[57] ABSTRACT

Disclosed is a technique for processing seismic data to enable the data to be migrated without stacking. Seismic data provided in common midpoint gathers are converted to a domain defined in terms of the travel time and the first power of velocity of reflected waves, and migration is performed in this domain. The migrated seismic data is converted back to the offset domain, wherein velocity analyses may be performed prior to stacking of the data.

17 Claims, 7 Drawing Sheets

OTHER PUBLICATIONS physics, Stanford University, *Stanford Exploration Project Report No. 33,* Nov., 1982, pp. iv, v, vii,viii, 13, 14, 35–63.

Wiggins, J. W. "Kirchhoff Integral Extrapolation and Migration of Nonplanar Data" *Geophysics,* vol. 49, No. 8, Aug. 1984, pp. 1239–1248.

Claerbout, J. F. "Imaging the Earth's Interior" Blackwell Scientific Publications, Boston, Palo Alto, 1985, Chapter 5, "Some Frontiers," pp. 309–315.

Clearbout, J. F. "Fundamentals of Geophysical Data Processing with Applications to Petroleum Prospecting" Blackwell Scientific Publications, Boston, Palo Alto, 1985, Chapter 11, "Seismic Data Processing with the Wave Equation," pp. 227–263.

Coffeen, J. A. "Seismic Exploration Fundamentals–Seismic Techniques for Finding Oil" Penn Well Books, Tulsa, 1986, Second Edition, Chapter 5, Data Processing, pp. 118–155, and Chapter 7, Additional Processes, pp. 170–218.

Gerlad, H. F., Wang, S. Y., Pan, N. D. and Zhang, Z. "Dikp Moveout and Prestack Imaging"OTC 5158, 18th Annual Offhshore Technolog Conference in Houston, Tx., May 5–8, 1986, pp. 75–81 and 3 pages of figures.

Yilmaz, O. "Seismic Data Processing" Society of Exploration Geophysicists, Tulsa, 1987, part 4.4 Migration before Stack, pp. 328–345.

Kim, Y. C., Gonzallez, R. and Berryhill, J. R. "Recursive Wavenumber–frequency Migration" *Geophysics,* vol. 54, No. 3, Mar., 1989, pp. 319–329.

Berryhill, J. R. "Kinematics of Crossline Prestack Migration" *Geophysics,* vol. 56, No. 10, Oct., 1991, Short Note, pp. 1674–1676.

Lub, P. C.; 61st Ann. Seg Int. Mtg., Nov. 10, 1991, vol. 2, pp. 1443–1447; Abst. Only Herewith.

Strickland et al; Explor. Geophys., vol. 221 #4, pp. 583–589, Dec. 1991; Abst. Only Herewith.

Lerner et al; 62nd Annu. SEG Int. Mtg. Oct. 25, 1992, Pap. No. SM3, pp. 979–983; Abst. Only Herewith.

Folkemer et al; SEG Abst., vol. 59–2, 1989, pp. 992–995; Abst Only Herewith.

METHOD OF PROCESSING SEISMIC DATA FOR MIGRATION

BACKGROUND OF THE INVENTION

1. Field of the Invention

The present invention pertains to the processing of seismic data, such as seismic imaging reflection data. More particularly, the present invention is related to techniques for preparing such seismic data for migration, and is applicable for use with two-dimensional (2-D) and three-dimensional (3-D) data.

2. Brief Description of Prior Art

Seismic exploration is carried out by generating acoustic waves by one or more sources which direct the wave fronts into the earth's subsurface. Wave fields reflected by subsurface structures, or horizons, are received at the surface by detectors, or receivers, such as geophones. The sources may be explosive devices, vibrating devices, falling weights, air guns or the like. Electrical cables connect the receivers to a monitor which records the electrical signals produced by the receivers in response to the detected acoustic waves. For seismic exploration conducted through a body of water, the receivers are hydrophones positioned along a streamer.

Signals from an array of receivers comprising a single line may be utilized to provide information about subsurface structures generally lying along a vertical plane. With such information, a 2-D vertical, seismic section of the subsurface may be produced, in pictorial form, for example. A receiver and source array comprising a multiplicity of generally parallel, and relatively closely-spaced lines of receivers and sources provides data which may be utilized to produce a 3-D representation of subsurface structures. A 3-D representation may be provided in cube form, for example, or any number of 2-D seismic sections may be generated from the 3-D data. Also, a horizontal slice, for example, corresponding to a chosen depth below the earth surface, may be generated from the 3-D data.

The seismic sections are constructed based on output signals from the receivers in response to detected acoustic waves. The output signal from a single receiver is presented as a trace in the form of a wave signal time plot. A single wave-producing activation of a source, called a shot, results in a collection of traces equal to the number of receivers. Aligning the traces in the order of the positions of the receivers in the line, for example, can produce a rudimentary seismic section. Such a section is thus a display of wave form data utilizing time along a vertical axis, and distance (locations of the sources) along a horizontal axis. More meaningful seismic sections are produced by processing the data represented by the traces, and combining data from multiple shots and/or from shots using various combinations of sources and receivers, for example. Various techniques are used to combine and process seismic data to make seismic sections and cubes more reliable and accurate sources of information concerning subsurface structures, thereby enhancing the usefulness of such data presentations in the quest for oil and gas deposits, for example.

One of the techniques utilized in processing seismic data is to combine traces produced from two or more shots wherein the midpoint between the source and the receiver in each case is the same, although the offset, or source-to-receiver distance (SGD), may be different in each case. This technique, called common midpoint (CMP) stacking, adds the data from multiple reflections from the same, or nearly the same, subsurface point via different paths, while noise that occurs at different times on the multiple traces is not added. The selection of a limited number of traces from all traces obtained is a gather; the selection of all traces of a CMP, such as to be combined in a stack, is a CMP gather.

Since the wave fronts received by receivers with increased SGD must travel greater distances under the surface than is the case for smaller SGD, the detection of a reflected wave from a given subsurface point occurs at a later time for the same shot in a trace obtained from a receiver with a greater SGD than is the case for a trace obtained from a receiver with a smaller SGD. The result is that, in a seismic section constructed from such traces, the wave pattern among the various traces corresponding to the same subsurface point appears at later points on the time scale. This phenomenon, called normal moveout (NMO), must be considered in processing the data for construction of useful sections. Appropriate adjustment, or compensation, for NMO is usually made.

Another phenomenon that must be considered in processing data for production of seismic sections useful for analysis is the effect of dip in the subsurface structures. If the subsurface reflecting structure is flat and horizontal, the reflecting point is directly under the midpoint of the SGD. This is true for all traces in a CMP gather for that point. However, if the reflecting surface is curved or tilted, or exhibits a dip, the reflecting point for a single trace will generally be shifted along the reflecting surface, and will not appear directly under the SGD midpoint. Further, for different values of SGD in the same CMP gather of traces, the amount of shifting of the reflecting point from under the midpoint will be different, depending upon the value of the particular SGD in question and the amount and direction of dip exhibited by the reflecting structure. Also, since the variation in wave paths due to dip is accompanied by a variation in the actual depth of reflecting points the velocity of the traveling wave fronts may vary with variations in depth. A wave reflected at one reflection point may have exhibited a different set of velocity values than a wave reflected at a point at a different depth. Differences in wave velocities exhibited by different waves, whose traces are collected in the same CMP gather, may also be due to the different waves reflected back to the surface having passed through different subsurface formations to and/or from the different points of reflection. This effect of shifting of reflection points due to dip in the reflecting subsurface structure is called reflection point smear, and can have significant effects on velocity analyses based on seismic sections if the smear is sufficiently large. Consequently, reflection point smear must normally be addressed in processing seismic data as well, utilizing dip movement (DMO) correction.

To produce a seismic section, as effectively a plot of depth, rather than time of signal reception, versus horizontal location, for example, data from the reflecting horizons must be assigned proper locations in the section. This process is generally accomplished on the basis of known average velocities of reflected waves, and is referred to as migration. Normally, without migration, the trace wave structures are positioned in a section such that the section fairly represents the real subsurface when horizons are flat and all the dip is relatively small. Unmigrated data in a section tends to deviate more from the actual representation of the real subsurface as the magnitude of dip increases. If the data have been migrated, each trace in a seismic section in 2-D, or in a cube in 3-D, may be considered to represent subsurface conditions directly below that trace's assigned position on the earth's surface. Migration thus improves the reliability of interpreting seismic data.

There are several methods commonly used for migrating seismic data after CMP stacking has been performed. There are several known methods for migrating seismic data before stacking, that concurrently perform the function of stacking, taking unstacked data as input and producing zero offset migrated data as output. The functions of stacking and migration are accomplished inseparably, at the same time. Such methods of joint stacking and migration are very sensitive to uncertainties in the velocity information. Obtaining an acceptable result using such processes may entail several lengthy iterations.

It is desirable and preferable to migrate seismic data without stacking, so that velocity analysis and other procedures can be performed on the migrated traces. This is particularly true in the case of 3-D seismic data. Such a method should preserve the identity of unstacked seismic data so that velocity determination can take place after migration but before stacking. There are not many known methods for migrating unstacked seismic data without simultaneously reducing the data to stacked seismic traces. One known method is to organize the data into common offset subsets and to apply to each subset NMO correction followed by DMO correction. Such common offset data can then be migrated as if they were zero offset, and the results sorted back into CMP gathers.

A seismic trace may possess, or be assigned, attributes in addition to time and position. For example, every recorded trace has a particular value of offset SGD. It is common practice to assemble groups of seismic traces having the same value of some attribute in order to exploit some benefit of processing these traces concurrently. For example, common offset 2-D sections or 3-D cubes are routinely employed in seismic processing.

The migration of common offset data is inconsistent with the wave equation. The wave equation yields methods for the downward continuation and migration of unstacked seismic data in common source/common receiver order, or in CMP order. Applying any of these methods to a collection of data requires that migration move information from one offset to another. If downward continuation proceeds to the depth of a particular reflector, all of the recorded information associated with that reflector moves to zero offset. The wave equation provides no method for the downward continuation or migration of data associated with a fixed offset, except for zero offset. Migration methods for the ease of zero offset depend upon the special assumption that downgoing and upcoming ray paths are identical. In general, therefore, common offset migration must rely upon a process to make the common offset section or cube tantamount to zero offset prior to migration. Compared to the wave equation methods that are now standard for full prestacked migration and for zero offset migration, common offset migration must employ additional approximations prior to migration. A known method to accomplish this preprocessing is to employ DMO correction. DMO processing is conceptually the equivalent of prestack migration, wherein all data are contracted to zero offset, followed by zero offset modeling, that is, migration run backward to produce the kinematic equivalent of unmigrated zero offset data. The overall net process can be applied in a single step to common offset data, and the output then behaves like zero offset data as far as migration and downward continuation are concerned. The validity of the migration is dependent on the validity of the DMO processing.

It is desirable and advantageous to provide a technique for prestack migration without including the expensive DMO processing step. It is an object of the present invention to provide an economical alternative to common offset migration that is independent of DMO processing.

SUMMARY OF THE INVENTION

The present invention provides a technique, applicable by use of a digital computer, for example, for processing seismic data, such as seismic reflection data, for performing migration on the data without first performing a DMO correction. The present invention may be applied to 2-D seismic data as well as 3-D seismic data. According to the present invention, the seismic data is grouped in multiple CMP gathers in the offset domain, and converted to a second domain that is defined by a quantity dependent on the first power of the velocity of the reflected waves as well as the assigned travel times of the data samples in the traces. In one version of the present invention, the defining quantity is identified as epsilon ($\epsilon$), which may be related to the eccentricity of an ellipse viewed as a reflecting surface for interacting with waves produced at a source and reflected to a receiver. In another form of the invention, the defining quantity, called TANPHI, is related to $\epsilon$, but is more closely identified with the interaction of waves with a reflecting surface. Either of the two second domains (the $\epsilon$ domain and the TANPHI domain) resulting from use of the aforementioned defining quantities may be utilized to condition the seismic data for migration in the selected second domain, after which the migrated seismic data may be returned to the offset domain, with the same results regardless of which second domain is used.

The seismic data is converted from the offset domain into the second domain one CMP gather at a time, that is, the data from one CMP gather is converted into data in the second domain, arranged in a corresponding CMP gather. The defining quantity is used to transpose the data into the second domain in each CMP gather. In general, it is necessary to utilize interpolation for at least some of the identification of data in the offset domain to form data samples in the second domain. Prior to conversion to the second domain, the seismic data is NMO-corrected to flatten the reflection responses of the data traces. Thereafter, lateral interpolation may be employed on the flattened seismic data.

In converting the seismic data to the second domain, in each CMP gather, traces characterized by specific values of the defining quantity of the second domain are formed. The traces constant in the defining quantity are sorted to form groups, or gathers, of data traces of common values of the defining quantity.

Migration is performed on the seismic data in the second domain in the form of gathers of traces, which are characterized by constant values of the defining quantity, with each gather comprising traces of the same, common, value of the defining quantity. The migration process is conducted for either 2-D or 3-D seismic data, depending on the application of the present method. Any form of 2-D or 3-D migration process may be employed, with an appropriate modification for crossline distances in 3-D.

After migration is complete, the seismic data is converted back to the offset domain. The traces of constant values of the defining quantity are sorted into CMP gathers, so that each CMP gather includes one or more data traces of different values of the defining quantity. The defining quantity is utilized to transpose seismic data from one CMP gather in the second domain to a corresponding CMP gather in the offset domain, with this step being conducted for all CMP gathers. In converting the seismic data to the offset domain, spread correction is performed so that lateral interpolation may again be utilized, now in the offset domain for each CMP gather to form common offset data traces within the respective CMP gather.

For some applications, the migrated data, converted back to the offset domain, is in condition for use, including further processing such as stacking. However, the present invention provides the opportunity for residual velocity analysis before stacking. The migrated seismic data converted back to the offset domain may be subjected to inverse NMO correction, followed by further velocity analysis. Thereafter, NMO correction may be applied to the seismic data, followed by stacking, for example.

The present invention may be employed on digitized data, and carried out, in whole or in part, utilizing one or more digital computers. The present invention is applicable to 2-D and 3-D data, and further is applicable to inline and crossline data gathers. Further, the present invention provides a reliable method of conducting migration not in the offset domain, and without the need of prior DMO correction.

DESCRIPTION OF PREFERRED EMBODIMENTS

Figure 1:
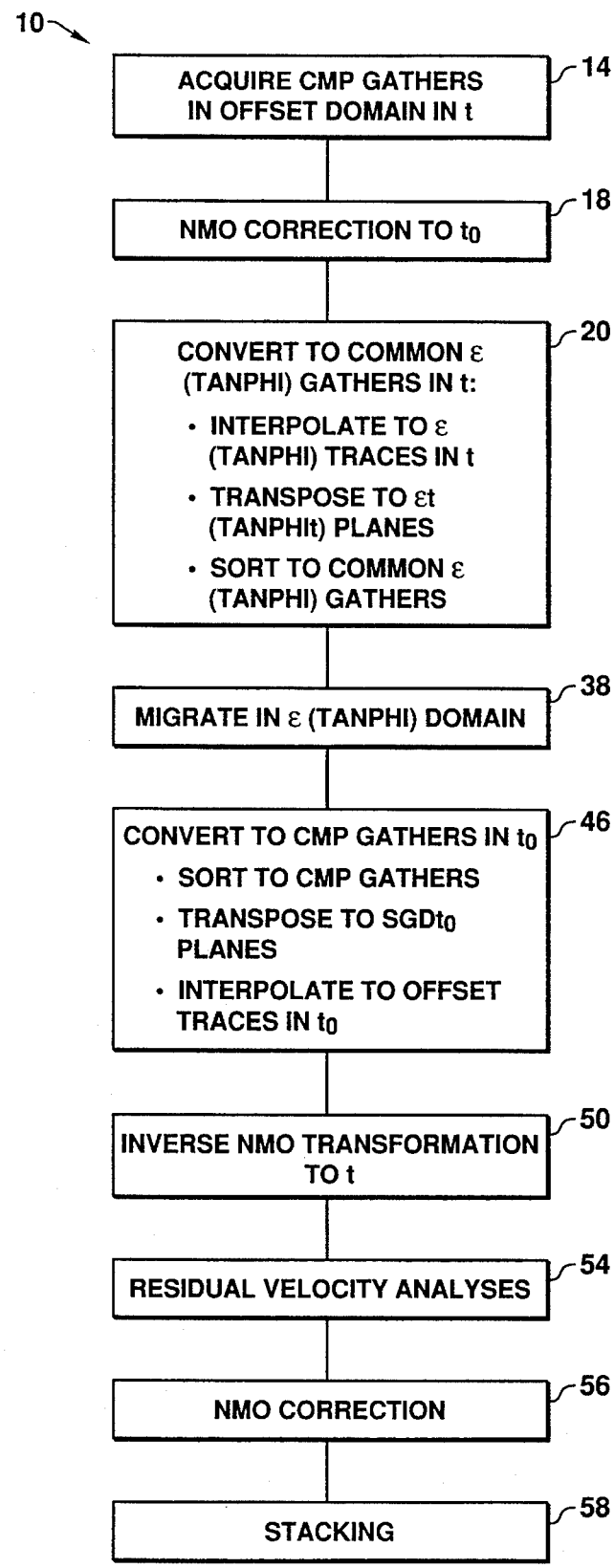
FIG. 1 is a flow diagram depicting a method of processing unstacked seismic data for migration as well as post-migration processing, incorporating the present invention.

A flow diagram of a method of processing seismic data is shown generally at 10 in FIG. 1. The process 10 enables seismic data to be migrated before stacking and without DMO correction, and further provides an opportunity for a final velocity analysis before stacking. Generally, the entire process 10 may be considered to have a forward portion, after which migration is performed, and an inverse portion following migration. The distinction between the forward process and the inverse process portions of the method 10 of FIG. 1 may be further appreciated by reference to FIG. 2 wherein the condition and representation of seismic data is illustrated generally at 12 at several stages of the process 10 of FIG. 1 as applied to 2-D data. The process 10 of FIG. 1 is applicable both to 2-D and 3-D seismic data, as will be further noted below in the detailed discussion of the process.

The process 10 of FIG. 1 is, in general, applied to data that is sorted, or grouped together, in CMP gathers. Each CMP gather includes a plurality of data traces with each trace characterized by a distinct SGD, or offset, so that data associated with a plurality of different offsets are included in each gather. With the data digitized, each trace in each gather may be considered to be a collection of data points, with each data point representing an amplitude value at a specific time value t representing the time of arrival of the point in the seismic trace at the corresponding receiver.

Acquisition of the plurality of CMP gathers is the first step 14 in the process 10 of FIG. 1. The acquired data is represented symbolically by the first cube 16 in FIG. 2. Several CMP gathers are positioned along the CMP coordinate, with each CMP gather including vertical data traces extending along the time t axis, and positioned along the SGD axis at their respective values of offset. The dotted lines on the top of the cube, running along and parallel to the SGD coordinate, indicate that the data is grouped by traces sequentially accessible in individual CMP gathers, and that each CMP gather may be operated on as a separate entity. The curved lines in the end panel represent subsurface coherent events such as reflections at horizons as displayed by the seismic data traces of the end CMP gather. In a 3-D case, the data might be represented by multiple cubes of the type 16, as is true for all of the different cubes shown in FIG. 2.

At the next step 18 of the process 10, NMO corrections are performed on the data traces in each gather to make selected reflections exhibited by the data appear flat and horizontal. Each data point, or sample, of each input trace is moved to a new time $t_0$, given by $$t_0 = [t^2 - SGD^2/V_{rms}^2]^{1/2}. \tag{1}$$

Equation (1) represents a velocity-dependent adjustment to the time scale of the data traces. In Equation (1), t is the original time of arrival at a receiver of a sample of the trace being corrected, SGD the offset for the given trace and $V_{rms}$ is the applicable root mean square velocity at time $t_0$ for the gather in which the trace being corrected is included.

In utilizing Equation (1) to effect NMO corrections, velocity analyses must be undertaken. The velocity $V_{rms}$ at various points along the seismic data traces will exhibit different values. $V_{rms}$ is defined for a fixed zero offset trace in the NMO correction process. In general, $V_{rms}$ is a measured parameter which may be arrived at in a variety of well known ways. Information concerning the nature of subsurface formations may be utilized, for example. Information based on other measurements in the vicinity of a seismic program may be referenced. In a region where sufficient information has been gathered concerning subsurface wave propagation velocities, whether by seismic programs or other means, a model for wave propagation velocities in the region may be constructed. In general, it will be understood that $V_{rms} = V_{rms}(t_0)$, that is, the root mean square velocity of subsurface seismic wave propagation is a function of the NMO-corrected wave trace arrival time $t_0$. This feature of $V_{rms}$ must be taken into account in constructing models for the values of root mean square velocity. Wherever $V_{rms}$ is expressed herein, it will be understood that $V_{rms}(t_0)$ is meant, that is, in general $V_{rms}$ is understood to be a function of the arrival time $t_0$ for NMO correction.

All of the samples of each trace in a given gather being corrected are provided with new time values $t_0$ given by Equation (1). NMO correction removes the curvature in the data due to the presence of different offsets. If a subsurface horizon reflecting the waves yielding the data is flat and horizontal, the NMO correction would make all the traces reflected from that horizon appear as zero offset traces. The purpose of the NMO correction at this stage 18 is to flatten the data so that interpolation may be readily performed in the next stage in a lateral direction rather than having to carry out interpolation on curved data. Even if some dip, or curvature, is present in a reflecting horizon, the present invention has sufficient tolerance to yield good results without use of a DMO correction.

Figure 3:
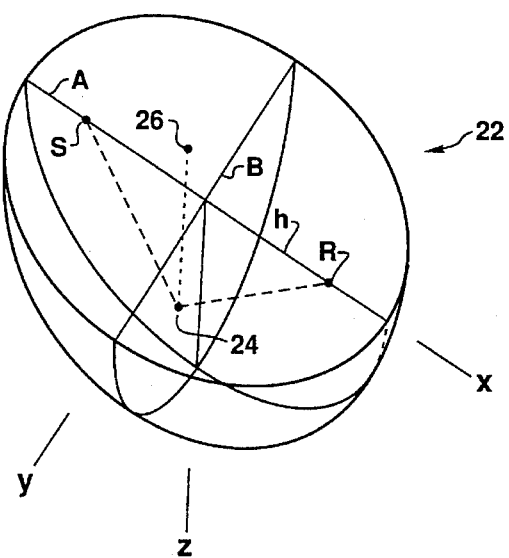
FIG. 3 is an illustration of half of an ellipsoid, centered on an orthogonal coordinate system, with a seismic source and a seismic receiver positioned at the foci of the ellipsoid, useful in considering the process of FIG. 1.

In the next step 20 of the process 10 of FIG. 1, the seismic data in time $t_0$ in each CMP gather are converted from the offset domain to the epsilon ($\epsilon$) domain defined below. To appreciate the conversion of step 20 of the process, consider an ellipsoid, the lower half of which is illustrated at 22 in FIG. 3. The ellipsoid 22 is centered on an orthogonal coordinate system xyz, with the x axis lying along the principal axis of the ellipsoid and the yz plane perpendicular to the principal axis. The ellipsoid 22 satisfies the equation $$[x^2/A^2]+[(y^2+z^2)/B^2]=1 \qquad (2)$$

where the semimajor axis A and the semiminor axis B are given by $$A^2=V_t^2 t^2/4 \qquad (3)$$

and $$B^2=A^2-h_r^2 \qquad (4)$$

respectively. Here, h is the distance from the center of the coordinate system to each of the two foci, indicated in FIG. 3 as points S and R, and $V_t$ is the total distance from one of the foci to the surface of the ellipsoid and then to the other focus. The ellipsoid may be considered a reflecting surface. Thus, if the xy plane is on the earth's surface and a seismic source is located at the focus S and a receiver is located at the focus R, $V_t$ is the length of a ray path from S to any reflecting, or scattering, point on the ellipsoid and then to R. The distance 2h from the source S to the receiver R along the x coordinate is the offset SGD. A reflecting point on the surface of the ellipsoid 22 is indicated generally at 24, with ray paths from the source S to the reflecting surface and to the receiver R. Further, the point 24 lies directly below a point indicated at 26 on the earth's surface, that is, in the xy plane. If an omnidirectional scatterer of seismic energy from the source S causes an impulse to be recorded at time t, and the SGD to the receiver R is 2h, and if the root mean square velocity is $V_{rms}$, then the scatterer, or the reflecting point, must lie somewhere on the ellipsoid 22. This fact is central to the kinematics of 3-D migration. The location of a scatterer on the ellipse lying in the xz plane is central to the kinematics of 2-D migration. For any arbitrary point on the xy plane, such as the point 26, having a scatterer, or a reflecting point, lying directly below, such as the point 24, the z coordinate for the reflecting point must be that which is obtained by solving the defining Equation (2).

The size of the ellipsoid 22 is determined by the values of the quantities A and B; the shape of the ellipsoid is determined by the relationship between the quantities A and B. In particular, the eccentricity $\epsilon$ of the ellipsoid 22 is defined by $$\epsilon=[1-B^2/A^2]^{1/2}. \qquad (5)$$

In seismic data terms the definition (5) of $\epsilon$ becomes $$\epsilon=SGD/(V_{rms}t) \qquad (6)$$

where t is the time assigned to a time sample of a digitally sampled trace, $V_{rms}$ is the applicable root mean square velocity used to determine the corrected time $t_0$, and $$t^2=t_0^2+SGD^2/V_{rms}^2. \qquad (7)$$

Equation (7) is another form of the NMO correction Equation (1).

Data are converted to the $\epsilon$ domain one CMP gather at a time. Each CMP gather comprises a plurality of traces, with the traces identified with respective, specific offsets, SGDs. The traces, which may be in the form of digitized waves, may be displayed on a graph of offset versus time of arrival of the waves at the receivers. Such a coordinate system is displayed in FIG. 4, with offset SGD measured horizontally on the graph and time of arrival t measured vertically. A particular seismic trace plotted on such a coordinate system would have a corresponding offset value, and would therefore be located at a particular position along the horizontal axis, and extend as a wave amplitude graph along the vertical time axis. Each data point on such a trace represents a wave amplitude value arriving at the corresponding receiver at a particular time t. Several seismic traces are so illustrated at 28 in the offset domain graph of FIG. 4.

Figure 4:
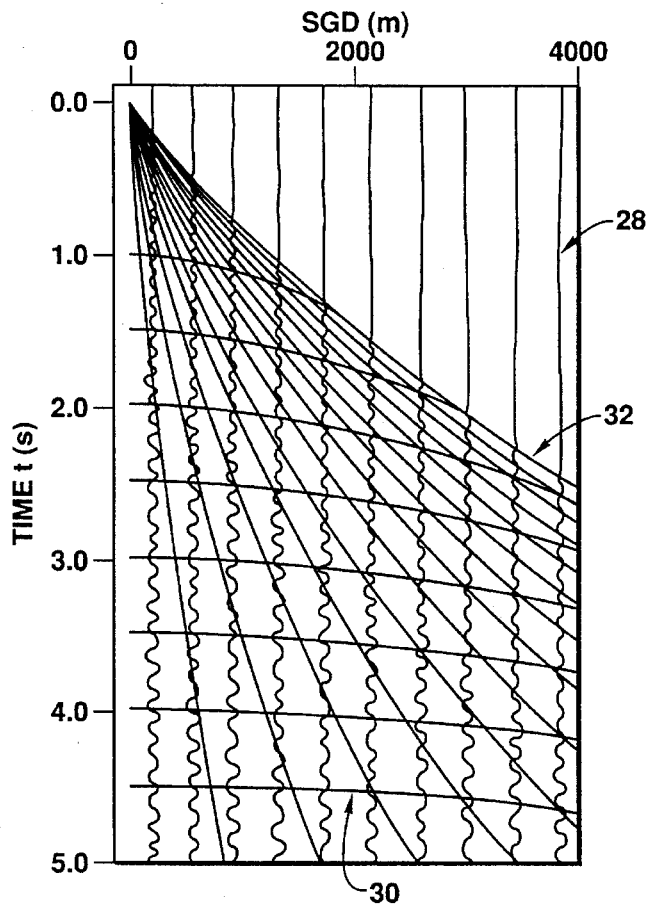
FIG. 4 is a plot of two families of curves useful in considering the process of FIG. 1, superimposed on offset traces of a CMP gather.

On the same graph of FIG. 4, Equation (7) represents a family of hyperbolas 30, symmetric about the time axis with a different value of to for each hyperbola. The particular value of time $t_0$ is the point along the time t axis (SGD=0) at which the respective hyperbola intersects that axis, and the value $V_{rms}$ determines the curvature of the hyperbola. In particular, the hyperbolas according to Equation (7) illustrated in FIG. 4 at 30 are constructed using a model for $V_{rms}$ given by $$V_{rms}=(1,500+400\ t_0) m/s, \qquad (8)$$

and values of to ranging from 1.0 sec to 4.5 sec at 0.5 sec intervals. The model of Equation (8) is an example of $V_{rms}$ as a function of $t_0$ that might be used in NMO corrections.

Values of $\epsilon$ can range from zero to one, as may be appreciated by reference to Equation (5). Curves of constant $\epsilon$ are constructed in FIG. 4 at 32 utilizing the same $V_{rms}$ model of Equation (8) in Equation (6). The constant $\epsilon$ curves thus illustrated in FIG. 4 at 32 converge at the origin, with $\epsilon$ values ranging from 0.05 to 0.70 in steps of 0.05. The curve 32 to the left in FIG. 4, closest to the time coordinate, has $\epsilon$ value of 0.05.

The upper limit of the value of $\epsilon=0.70$ corresponds to a stretch mute parameter of 40%, that is, that value of $\epsilon$ corresponds to the cut off in seismic data for large offset values and early arrival times. In FIG. 4, the family of constant $\epsilon$ curves 32 crosses any one of the hyperbolas 30 at almost uniformly spaced offset values. The spacing of these intersections would be exactly uniform if $\epsilon/[1-\epsilon^2]^{1/2}$ rather than $\epsilon$ were evenly sampled to construct the constant $\epsilon$ curves. In FIG. 4 the stretch mute limit intersects the maximum offset value at approximately 2.5 sec.

For a particular value of $\epsilon$, given specific values for $t_0$ and $V_{rms}$ measured in $t_0$ time, the real time t and offset SGD values for a data point in a CMP gather can be located using $$t=t_0/[1-\epsilon^2]^{1/2} \qquad (9)$$

and $$SGD=\epsilon V_{rms}t_0/[1-\epsilon^2]^{1/2}, \qquad (10)$$

respectively. Equations (9) and (10) may be found from Equations (6) and (7). The CMP gather seismic data are converted to the $\epsilon$ domain utilizing Equations (9) and (10). In the $\epsilon$ domain, constant $\epsilon$ seismic traces are constructed which may be displayed in a coordinate system with $\epsilon$ values rather than offset values measured along the horizontal axis, for example, and arrival times t measured along the vertical axis. Constant $\epsilon$ traces appearing on such a coordinate system would intersect the $\epsilon$ coordinate at corresponding locations, and generally parallel the time coordinate.

To construct such a constant $\epsilon$ trace, a value of $\epsilon$ is selected, values of $t_0$ are chosen at selected intervals over a selected range of $t_0$, and Equations (9) and (10) utilizing that $\epsilon$ value are sequentially solved, using the different values of $t_0$, for values of t and the offset, SGD, respectively. Values for $V_{rms}$ are utilized in Equation (10) according to the values of this parameter that have been measured, or determined by a model, as discussed above, for example. Thus, a value of $V_{rms}$ is determined for each selected value of $t_0$, and Equations (9) and (10) are solved for values of t and the offset, SGD, for that value of $t_0$. The calculated value of SGD for a given value of $t_0$ locates a point on the SGDt$_0$ plane of the CMP gather that is being converted. The amplitude of the wave trace at that point is read and inserted as a data point at the time t calculated from Equation (9) on the $\epsilon$ trace being constructed in the $\epsilon$ domain. Then, the value of $t_0$ is changed by the selected increment, $V_{rms}$ determined for the new value of $t_0$, and Equations (9) and (10) are solved again for new values of t and SGD. Thus, a new location on the SGDt$_0$ plane of the CMP gather is identified, and the seismic amplitude at that point is determined and becomes a data point at the newly-calculated time t on the same $\epsilon$ trace being constructed in the $\epsilon$ domain. This process is continued for the full range of to selected, with corresponding variations in the value of $V_{rms}$, to identify a plurality of locations on the $t_0$ versus SGD plot for the CMP gather. At each point thus identified in the CMP gather, the wave amplitude is read and becomes a data value in the $\epsilon$ trace for the corresponding value of t. In this way, the constant $\epsilon$ trace is constructed in the $\epsilon$ domain, and may be plotted as a function of the time of reception t.

With a constant $\epsilon$ trace thus formed by acquiring data for all selected values of $t_0$, a new value of $\epsilon$ is selected, and the procedure of constructing another $\epsilon$ trace is carried out, using Equations (9) and (10) for all selected values of to in the chosen range. The process of forming $\epsilon$ traces, using Equations (9) and (10) for all $t_0$ values for each selected $\epsilon$ value is repeated until $\epsilon$ traces have been constructed for all selected values of $\epsilon$. In this way, seismic data in a CMP gather are converted from the offset domain to the $\epsilon$ domain.

This process of converting data to the $\epsilon$ domain is repeated for each CMP gather until all of the acquired seismic data is in the $\epsilon$ domain, located in constant $\epsilon$ traces as functions of time t.

In general, wave propagation velocity increases for increased subsurface depths. Consequently, the shape of constant $\epsilon$ plots will generally disperse from the origin as shown by the constant $\epsilon$ curves 32 in FIG. 4 based on Equation (8). The variation of $V_{rms}$ with reception time, whether determined by measurement or by modeling, for example, will determine the curvature of constant $\epsilon$ plots on an offset graph as illustrated in FIG. 4. Consequently, constant $\epsilon$ curves plotted in the offset domain generally tend to cut across the wave traces of a CMP gather superimposed on the same coordinate system. The points for (SGD, $t_0$) calculated using Equation (10) for a particular value of $\epsilon$ lie along the constant $\epsilon$ curves, generally as shown at 32 in FIG. 4 using the model of $V_{rms}$ of Equation (8). In the construction of a constant $\epsilon$ trace in the $\epsilon$ domain based on a particular CMP gather in the offset domain, data values for the constant $\epsilon$ trace may be taken from seismic traces throughout the range of offset values for which data traces have been acquired in that CMP gather.

In the conversion to the $\epsilon$ domain, the parameters may be selected in such a way that the number of constant $\epsilon$ seismic traces coincides with the number of offset traces from the instant CMP gather. Then, the constant $\epsilon$ traces would be more dense than the offset traces at earlier reception times and less dense at later reception times. A balance may be sought in the construction of the total number of constant $\epsilon$ traces in the conversion to the $\epsilon$ domain against considerations of high frequency noise at early reception times and mixing at later reception times.

There is a high probability that, for a given value of $\epsilon$ and for a specific value of $t_0$, the calculated value of SGD will not correspond to a specific seismic trace in the CMP gather being converted. Instead, the point (SGD, $t_0$) determined by Equation (10) may lie between two offset traces in the SGDt$_0$ plane. In such a case, a lateral interpolation, that is, an interpolation along the horizontal offset direction, can be made using the wave amplitude values of data samples at the selected value of $t_0$ for traces with offset values above and below the calculated SGD value. Since the CMP gather has been NMO-corrected, the lateral interpolation can be made as opposed to an interpolation which might lie along a hyperbola as shown at 30 in FIG. 4. Any desired interpolation technique, appropriate for the application, including consideration of the spacing between CMP gather traces, for example, may be utilized. For example, the next adjacent data points along the offset direction to each side of the calculated value of SGD may be used in the interpolation. Such a linear interpolation is generally acceptable for determining the constant $\epsilon$ trace data point. Alternatively, the two closest data points on each side of the calculated value of SGD may be used in the interpolation technique known as cubic spline weights. In general, if the data points being used in the interpolation are not uniformly spaced along the offset direction, or the calculated value of SGD does not fall midway between data points being used in the interpolation, for example, the data point values may be weighted in the interpolation accordingly.

It will be appreciated that the conversion of the seismic data in step 20 from NMO-corrected CMP gathers in the offset domain to the $\epsilon$ domain, utilizing Equation (9), restores the data to time t from $t_0$, thereby eliminating the NMO correction from the data.

Figure 2:
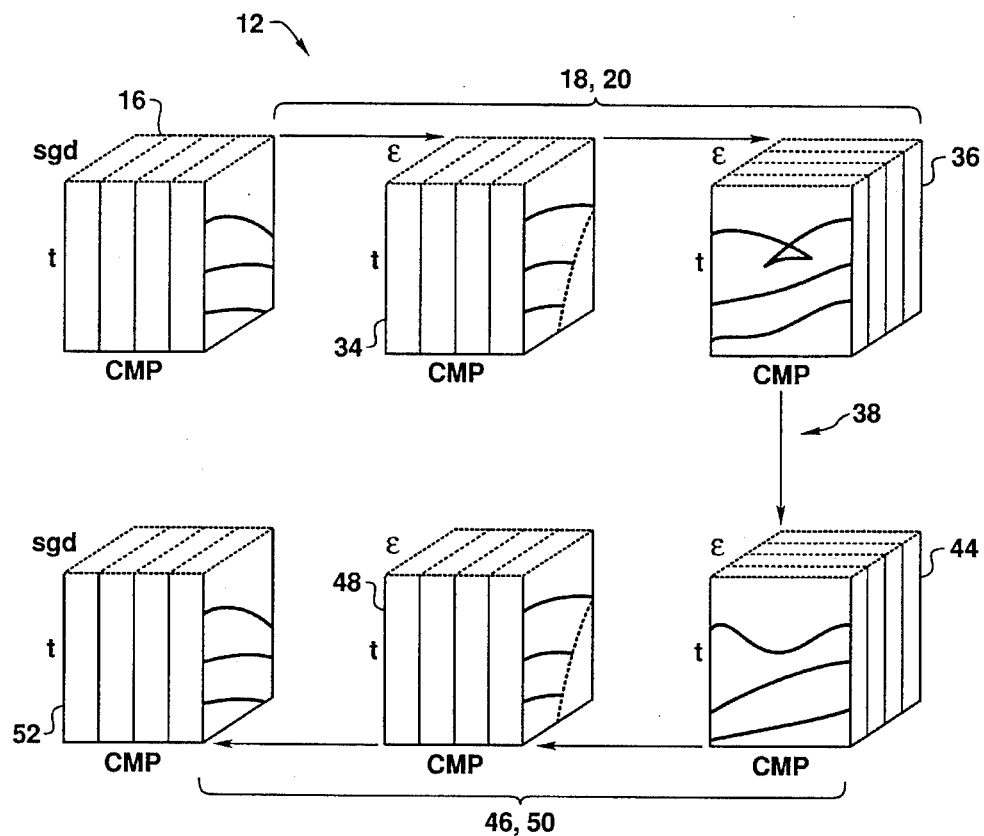
FIG. 2 is a flow graphical representation of 2-D seismic data processing at various stages of the method depicted in FIG. 1.

Cube 34 in FIG. 2 indicates the condition of the seismic data after conversion to the $\epsilon$ domain in step 20 of the process 10. The data is present in each CMP gather in constant $\epsilon$ traces, plotted as functions of time t. The dotted lines along and parallel to the $\epsilon$ coordinate in the top panel indicates that the $\epsilon$ traces may be considered sequentially arranged and accessible within their respective CMP gathers from which the data was obtained to form the respective $\epsilon$ traces. The end panel indicates coherent events now displayed by the $\epsilon$ traces in the end CMP gather. The dotted line marking the end of the data along the coherent events is consistent with the maximum SGD trace in the data discussed above. Again, for 3-D cases, multiple cubes of the type 34 could be used to illustrate the condition of the data.

As part of step 20 the $\epsilon$ traces may be sorted to form common $\epsilon$ gathers, as indicated in cube 36 of FIG. 2, with multiple such cubes present for a 3-D case. The sorting of the data into common $\epsilon$ gathers is accomplished in anticipation of the migration to be performed on the data, as discussed below. Migration of the data in the $\epsilon$ domain is carried out on individual gathers of common ε traces, with each gather of common ε traces arranged and accessible sequentially within the gather according to the same order of original offset CMPs. The dotted lines running along and parallel to the CMP coordinate in the top panel of cube 36 in FIG. 2 indicate that the data traces are arranged and accessible in groups, or gathers, of common ε traces, with the constant ε traces in each ε gather sequentially arranged in the same order of CMP identities. The front panel of the cube 36 shows three coherent events displayed by the data traces for the ε value of that front gather. One of the events in the panel is an syncline.

The ε traces are sorted into the arrangement indicated in block 36 so that they may be accessed sequentially in the order of CMPs for each ε value in the migration step. In practice, the seismic data may be so extensive that it must be stored on one or more tapes for processing by computer. In such cases, the sorting process may actually involve transferring data between tapes to alter the sequential positioning of the data on the memory tapes. This is particularly true in 3-D cases. If random access data storage on a disk or the like is available, however, the sorting step may be accomplished by adjusting data base designations, for example.

At the conclusion of step 20, each seismic data sample is associated with its original time t, but is contained in a seismic trace associated with a particular value of ε. With step 20 completed for all ε traces, the seismic data are in condition for migration in the epsilon domain.

In step 38 of the process 10, the seismic data are migrated in the ε domain, with the migration process carried out on data in the form of constant ε traces, with each set of common ε traces operated on for all CMP designations. In the case of 3-D migration, all of the common ε gathers for a given ε value are migrated together. The geometrical properties of common ε migration may be appreciated by recalling that ε is identified as the geometrical eccentricity of an ellipsoid whose foci are the source and receiver locations for a seismic wave ray.

Figure 5:
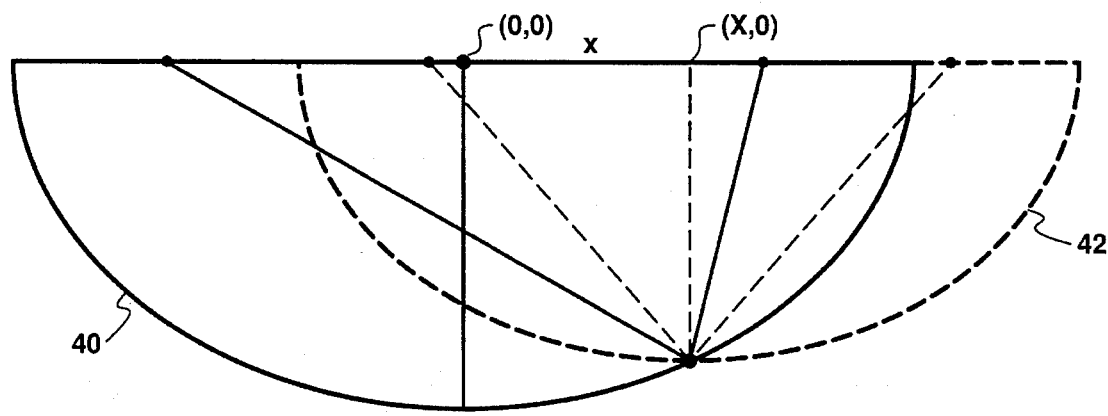
FIG. 5 is an illustration of two ellipses showing the kinematic relationships for prestack inline migration.

In FIG. 5 an unbroken ellipse 40 defines possible positions of a scatterer that caused a seismic impulse to be recorded at time t, with the source and receiver located at the two foci of the ellipse, and with the origin (0, 0) of the coordinate system being at the midpoint between the source and receiver. Equations (2)–(7) analyze the ellipse. The x axis lies along the inline direction and the y axis, perpendicular to the plane of the paper, lies along the crossline direction. Consider that the x coordinate of the scatterer is X, and construct a new dashed-line ellipse 42 having the same eccentricity ε but centered at the location X along the x axis. The semimajor axis of the original unbroken ellipse 40 is given by $V_t/2$; the semiminor axis for the new ellipse 42, centered over the location of the scatterer, is $V_t'(1-\epsilon^2)^{1/2}/2$. $V_t'$ is the distance from a focus of the ellipse 42 to its surface, and then to the other focus of the same ellipse. If the semiminor axis value of the ellipse 42 is substituted for $(y^2+z^2)^{1/2}$ and $X^2$ is substituted for $x^2$ in the defining Equation (2), the value for t' is given by $$t' = t \left[ 1 - \frac{4X^2}{V^2 t^2} \right]^{1/2}. \quad (11)$$

Equation (11) is the impulse response for 2-D inline common ε migration. This equation shows how a single input sample gets distributed to output traces under such a migration process. Here t' is the time of an output trace at which a pulse appears if there is a pulse at time t on an input trace and the distance between input and output locations is X. Equation (11) is the same kinematic relationship that applies to zero offset migration. Thus, an unmodified zero offset migration process may be utilized to perform 2-D inline migration of unstacked data by working with data that has a fixed value of ε. Here, x is the inline distance.

A migration of a 2-D crossline common ε gather may be accomplished by first multiplying all times t and t' in Equation (11), written for a scatterer at Y in the crossline direction y, by $(1-\epsilon^2)^{1/2}$ to obtain $$t'(1-\epsilon^2)^{1/2} = t(1-\epsilon^2)^{1/2} \left[ 1 - \frac{4Y^2}{V^2 t^2 (1-\epsilon^2)} \right]^{1/2}, \quad (12)$$

and then employing any migration program ordinarily employed for the migration of stacked seismic data. Equation (12) is the impulse response for 2-D crossline common ε migration and is the same as the kinematic relationship for 2-D zero offset migration with the exception that the time t is multiplied by $(1-\epsilon^2)^{1/2}$. By comparison with Equation (9), it will be seen that Equation (12) includes an NMO correction.

A one-pass 3-D migration for common ε may also be accomplished. Consider again Equations (2)–(7), and FIGS. 3 and 5. If a scatterer is located at a point (X, Y, Z) on the ellipsoid 22 centered at the origin in FIG. 3, the analysis starting with Equation (2) may be repeated, where $z = V_t'(1-\epsilon^2)^{1/2}$, x=X and y=Y. Then, the output time t' is given by $$t' = t \left[ 1 - \frac{4X^2}{V^2 t^2} - \frac{4Y^2}{V^2 t^2 (1-\epsilon^2)} \right]^{1/2}. \quad (13)$$

Equation (13) is the impulse response for one-pass 3-D migration and is the same as the kinematic equation for one-pass 3-D zero offset migration, with the exception that the crossline distance y is divided by $(1-\epsilon^2)^{1/2}$.

In Fourier-transform implementations of 3-D migration, the spatial frequency ky corresponding to the crossline direction will be multiplied by $(1-\epsilon^2)^{1/2}$. Therefore, the dispersion relation for 3-D ω—k migration of constant ε data is $$4\omega'^2/V^2 = 4\omega^2/V^2 - k_x^2 - (1-\epsilon^2)k_y^2, \quad (14)$$

with the understanding that ω'←→t', ω←→t, x←→$k_x$, and y←→$k_y$, where the double arrow symbol denotes Fourier-transform conjugate variables. Utilizing data having a fixed ε value, an ordinary 3-D zero offset migration procedure may be employed providing that the crossline coordinate, or its Fourier conjugate, is appropriately rescaled by a factor dependent upon ε as discussed above.

Whatever migration technique is utilized, and whether the migration is 2-D or 3-D, the migration process is completed in the ε domain in step 38. Cube 44 in FIG. 2 represents the condition of the data in the ε domain after migration. Constant ε traces are grouped in common ε gathers plotted versus time t, with the traces in each ε gather arranged in order of the respective CMPs from which the data were obtained. The front panel shows the three coherent events displayed on the front panel of the pre-migration cube 36, now having been migrated. Steps may now be taken to return the data to traces with fixed offset values in the offset domain.

Steps 18 and 20 in the process 10 of FIG. 1 are carried out on CMP gathers acquired in the offset domain to condition the seismic data for migration in the epsilon domain. In order to obtain traces with fixed offset values from traces of fixed ε values, these steps 18 and 20 are each effectively inverted, and carried out in their reverse order.

In step 46 of the process 10 the seismic data is converted from the ε domain to the offset domain. The constant ε traces are sorted from common ε gathers in t to CMP gathers in t, as indicated by cube 48 in FIG. 2. The sorting step is effectively the reverse of the sorting step between cubes 34 and 36. In cube 48, the data are present in ε traces, but the traces are arranged for sequential accessing in individual CMP gathers. As discussed above, the sorting step may involve the actual movement of data among computer memory tapes, for example, due to the large amount of data. If the seismic data can all be contained in a single random access memory, however, the sorting may be done by data base renaming, or a like process. As represented in cube 48 the result of the sorting yields constant ε traces arranged in individual CMP gathers, as indicated by the dotted lines in the top panel, running along and parallel to the ε coordinate. The end panel shows three coherent events, again with a dotted line marking the end of the data and consistent with the maximum SGD trace in the original seismic data.

The conversion from the ε domain to the offset domain is carried out on individual CMP gathers. Equation (9) may be rewritten as $$t_0 = t(1-\epsilon^2)^{1/2}. \tag{15}$$

Consider one CMP gather. For each value of ε, values of $t_0$ can be calculated from Equation (15) for a range of values of t, separated by a selected interval, for example. Calculating $t_0$ values in this manner rescales the time coordinate, and effectively makes NMO corrections. For each calculated value of $t_0$, a value of $V_{rms}$ is determined by measurement, modeling, etc., as discussed above. The same $V_{rms}$ function of $t_0$ is used. Thus, a constant $V_{rms}t_0$ can be determined, and a value for SGD calculated by way of Equation (10). For a specific CMP gather, a value of ε is chosen, and values of t chosen over a range. For each value of t, a data point can be located on the ε trace, and the amplitude of that data point noted. For the same values of ε and t, a value of $t_0$ from Equation (15) is used to identify a corresponding value of $V_{rms}$, and the product $V_{rms}t_0$ is used, with the value of ε, in Equation (10) to determine a value of SGD. The calculated value of SGD for the corresponding value of $t_0$ locates a point on the SGD$t_0$ plane for the CMP gather being converted. The wave amplitude from the ε trace is effectively placed at that point (SGD, to). Wave amplitudes are read for all chosen t values for all ε traces in the CMP gather in the ε domain, and recorded at the corresponding location in the SGD$t_0$ plane in the offset domain, found by determining $t_0$, $V_{rms}$ and SGD.

The (SGD, $t_0$) data points, comprising wave amplitude values, are formed into constant offset traces for specific values of SGD in the CMP gather. Values of SGD are selected, such as the values of the original input constant offset traces in the particular CMP gather, as represented in cube 16. For a particular offset value SGD, the calculated values of $t_0$ are noted, and a wave amplitude data point is made part of a trace at each location determined by the values of $t_0$. As is the case of the conversion to the ε domain in step 20, there may be no data point at a particular point (SGD, $t_0$) in the trace being formed, and interpolation must be employed. Since the data in $t_0$ is effectively NMO-corrected, the data is flat in time $t_0$, rather than lying along hyperbolas (see FIG. 4). Consequently, lateral interpolation may be employed to obtain a wave amplitude data point at a particular (SGD, $t_0$) point, using one or more data point amplitude values along the SGD coordinate at $t_0$. Linear or more elaborate interpolation techniques may be employed as appropriate.

All of the ε traces of each of the CMP gathers are converted to the offset domain in $t_0$ in this manner to complete step 46. The result is an array of constant offset traces, each related to a specific value SGD, arranged in CMP gathers in time $t_0$ so that the traces are sequentially accessible within each CMP gather by successive offset values SGD.

With the data converted from the ε domain to the offset domain in step 46, the process may proceed in different ways, depending on the nature of the data and the intended use of the process results. If the data is to be stacked without further modification, the stacking can be done immediately after step 46, with the data presented along the time $t_0$ scale. Generally, a residual velocity analysis is to be performed. As a result of the migration, the offset traces should look the same as far as being functions of time of reception. However, practically speaking, this is not always the case. For example, there may be some imprecision in the velocities used in the various conversion and correction steps. The function $V_{rms}(t_0)$ can be based on broad estimations and still be effective in the NMO corrections while more refined and detailed velocity corrections may be needed to use the seismic data for analyzing subsurface structures, for example. Also, the function $V_{rms}(t_0)$ is chosen to make the coherent events in the data flat and horizontal, but these choices for $V_{rms}$ may not be the most accurate, actual subsurface velocities. Consequently, it may be necessary to perform a residual velocity analysis on the migrated data.

To prepare the data for residual velocity analysis, the CMP gathers undergo an inverse NMO correction to actual reception time t at step 50 in the process 10 of FIG. 1, using Equation (7) and the $V_{rms}$ previously used in the process. Cube 52 of FIG. 2 illustrates the condition of the data after the inverse NMO transformation of step 50. The data are contained in constant offset traces, arrayed in CMP gathers, as functions of actual reception time t. The dotted lines on the top panel, running along and parallel to the offset coordinate, indicate that the traces are sequentially accessible within each CMP gather separately. The end panel shows three coherent events, now migrated.

Again, for 3-D cases, each of cubes 44, 48 and 52 would be accompanied by multiple such cubes to illustrate the 3-D data.

It will be appreciated that the inverse NMO correction of step 50 is the inverse of the forward NMO correction step 18. Also, the conversion from the ε domain to the offset domain step 46 is the inverse of the conversion from the offset domain to the ε domain step 20. In step 20, the data is interpolated to make up ε traces in t, transposed to εt planes, and sorted from CMP gathers to common ε gathers. In step 46, the data is sorted from ε gathers to CMP gathers, transposed to SGD, $t_0$ planes, and interpolated to make up offset traces.

At step 54 in the process 10, a residual velocity analysis is performed for each gather. In the velocity analyses, hyperbolas in the data gathers may be examined to arrive at the most accurate, refined velocity choices for correcting the data to achieve the best possible output image. The residual velocity analysis is effectively an NMO correction utilizing different velocity functions based upon the condition of the migrated data, for example. Thereafter, at step 56 in the process 10, a routine NMO correction may be performed, utilizing Equation (1) and rescaling the time coordinate to $t_0$.

The seismic data is now in the form of CMP gathers displaying seismic wave amplitude information in constant offset traces as functions of vertical travel time. The seismic traces may be stacked at step 58 in the process 10 of FIG. 1, for example, to complete the process. In step 58, all of the traces in a given CMP are added, or stacked, thereby collapsing the cube in a representation such as shown in FIG. 2, with the collapse occurring along the SGD coordinate, resulting in a data display in the CMPt plane, for example.

It is convenient, and in some ways preferable as discussed below, to define a term other than $\epsilon$ to be used for migrating the data. As noted above, $\epsilon$ is a number between 0 and 1, like the sine of an angle. Consider a theoretical angle p such that $\epsilon$ =sin . Consider the tangent of the angle $\phi$, expressed as TANPHI. Then, TANPHI is given by $$TANPHI^2 = \epsilon^2/(1-\epsilon^2). \quad (16)$$

TANPHI is effectively a scaler of $\epsilon$. A constant $\epsilon$ trace is an unstacked seismic trace in which each time sample is associated with a different offset SGD. The offset increases with time according to Equation (10). All time samples in a constant $\epsilon$ trace have the same value of $\epsilon$. Equation (9) provides a value of t for any given zero offset time $t_0$, with $V_{rms}$ being the velocity used to NMO-correct a particular time sample in the absence of dip. The time sample at t lies on some hyperbola, and the root mean square velocity at the apex of the hyperbola is the value that applies. If we know the $\epsilon$ value for a particular trace, we can always know the TANPHI value, and vice versa, according to Equation (16). A fixed value of $\epsilon$ implies a fixed value of TANPHI, and vice versa. From Equations (10) and (16) TANPHI may be expressed in terms of the time and velocity parameters by $$TANPHI = SGD/(V_{rms}t_0). \quad (17)$$

If a gather of offset traces is spread-corrected, the denominator in Equation (17) is the same for all samples having the same arrival time $t_0$, and TANPHI is then directly proportional to SGD.

For a flat plane in a layered medium, TANPHI is related to the reflection angle through Snell's law. Thus, common $\epsilon$ data, which is also common TANPHI data, has potential value in studying the relationship between reflection amplitude and reflection angle for seismic traces.

Because of the relationship between $\epsilon$ and TANPHI, it will be appreciated that the process 10 of FIG. 1 may be carried out in terms of TANPHI traces, in a TANPHI domain, with the same results as obtained by using $\epsilon$. The first two steps 14 and 18 of the process 10 do not involve $\epsilon$ and are therefore the same for use with TANPHI. In step 20 the CMP gathers are converted from the offset domain into data in the TANPHI domain. The constant $\epsilon$ curves such as illustrated at 32 in FIG. 4 would be replaced by constant TANPHI curves, again based on measured or modeled values for $V_{rms}$ as functions of $t_0$. All other aspects of step 18 of the process 10 are conducted in the same manner as discussed above in terms of $\epsilon$, with the exception that common TANPHI traces are formed in t by identifying data points in a particular NMO-corrected CMP gather in the offset domain and constructing corresponding data points in a common TANPHI trace in the TANPHI domain.

In particular, constant TANPHI traces are constructed from wave amplitude data points in the offset traces by locating points in the $SGDt_0$ plane for a single CMP gather at a time. A relationship between t and $t_0$ for TANPHI traces may be obtained from Equations (9) and (16) as $$t = t_0[1+TANPHI^2]^{1/2}. \quad (18)$$

Equation (17) may be rewritten as $$SGD = V_{rms}t_0 TANPHI. \quad (19)$$

A range of TANPHI values is selected, and specific values of TANPHI in that range are also chosen, for example. In selecting the specific values of TANPHI to be used in the conversion of step 20, it is generally preferred that the number of discrete values of TANPHI so chosen be separated by the same increment, and be equal to or larger than the number of offset values SGD for which offset traces exist in the originally acquired data. A range of $t_0$ values is chosen, and an interval or intervals between values in that range is also chosen, for example. Values of $V_{rms}$ are obtained for each value of $t_0$ as discussed above. For each value of TANPHI, all of the values of $t_0$ are utilized, one at a time, in Equation (18) and (19) to identify corresponding points on the $SGDt_0$ plane of the CMP gather and corresponding points t in the TANPHIt plane. In each case, the wave amplitude data at the calculated point (SGD, $t_0$) is read and becomes a data point of the constant TANPHI trace being formed, located at time t. As in the case of conversion to the $\epsilon$ domain, interpolation may be performed among the offset trace data points whenever a calculated value of SGD does not correspond to an offset trace.

With data points found for all values of $t_0$ for a given value of TANPHI, the value of TANPHI is changed to form a new constant TANPHI trace, again by using Equations (18) and (19). All values of TANPHI are thus used to form TANPHI traces in the TANPHIt plane for a given CMP gather. This process is carried out for all CMP gathers, with the result that the seismic data is converted to constant TANPHI traces, sequentially accessible within CMP gathers after the fashion of the $\epsilon$ domain cube 34 in FIG. 2. Step 20 is completed by sorting the TANPHI traces into common TANPHI gathers, after the fashion of the common $\epsilon$ traces indicated in cube 36 of FIG. 2.

At the conclusion of step 20 in the TANPHI domain, each seismic data sample is associated with its original time t, but is contained in a seismic trace associated with a particular value of TANPHI, and, hence, $\epsilon$.

After the completion of the conversion to the TANPHI domain in step 20, migration in the TANPHI domain is carried out in step 38 in the process 10 generally as discussed above in connection with migration in the $\epsilon$ domain. Based on Equation (16) defining TANPHI, the cosine of the theoretical angle $\phi$ (COSPHI) may be defined as $$COSPHI = (1-\epsilon^2)^{1/2}. \quad (20)$$

Equation (11) applies also to 2-D inline common TANPHI migration. For 2-D crossline common TANPHI migration, Equation (12) becomes $$t'COSPHI = tCOSPHI\left[1 - \frac{4Y^2}{V^2t^2COSPHI^2}\right]^{1/2}. \quad (21)$$

For one-pass 3-D migration for common TANPHI, Equation (13) becomes $$t' = t\left[1 - \frac{4X^2}{V^2t^2} - \frac{4Y^2}{V^2t^2COSPHI^2}\right]^{1/2}. \quad (22)$$

The Fourier crossline transform spatial frequencies are thus to be multiplied by COSPHI, or the crossline distances divided by COSPHI, in the matter of 3-D migration in a common TANPHI cube, for example.

The migration process is completed at step 38 in the TANPHI domain, after which the migrated data are converted back to traces with fixed offset values in the offset domain. Again, steps 18 and 20 are effectively inverted and carried out in reverse order. In step 46, the constant TANPHI traces are sorted from common TANPHI gathers in t to CMP gathers in t. The conversion from the TANPHI domain to the offset domain is carried out on individual CMP gathers. Equation (18) may be rewritten as $$t_0 = t/(1+TANPHI^2)^{1/2}. \tag{23}$$

For one CMP gather, for each value of TANPHI, values of $t_0$ can be calculated from Equation (23) for a range of values of t, separated by a selected interval, for example. For each value of $t_0$, a value for $V_{rms}$ is determined as discussed above, and a value for SGD is obtained using Equation (19). For each value of t, a data point on the TANPHI trace is located and the wave amplitude of that data point read. The corresponding calculated values of $t_0$ and SGD locate a point on the $SGDt_0$ plane for the CMP gather being converted, and the wave amplitude from the TANPHI trace becomes a data value at the point (SGD, $t_0$). Seismic amplitudes are read for all chosen t values for all TANPHI traces in the CMP gather in the TANPHI domain, and recorded at the corresponding location in the $SGDt_0$ plane in the offset domain found by determining $t_0$, $V_{rms}$ and SGD.

The (SGD, $t_0$) data points are formed into constant offset traces for selected values of SGD in the CMP gathers, as discussed above in relation to conversion from the $\epsilon$ domain. Again, interpolation may be utilized, as discussed above, if there is no data point for a particular selected SGD value at a calculated $t_0$ value.

All of the TANPHI traces of each of the CMP gathers are converted to the offset domain in $t_0$ in this manner to complete step 46. The result is an array of constant offset traces, each related to a specific value SGD, arranged in CMP gathers in time $t_0$ so that the traces are sequentially accessible within each CMP gather by successive offset values SGD.

After the completion of step 46, the remaining steps in the process 10 are not TANPHI-specific, and may be carried out as discussed above.

Figure 6:
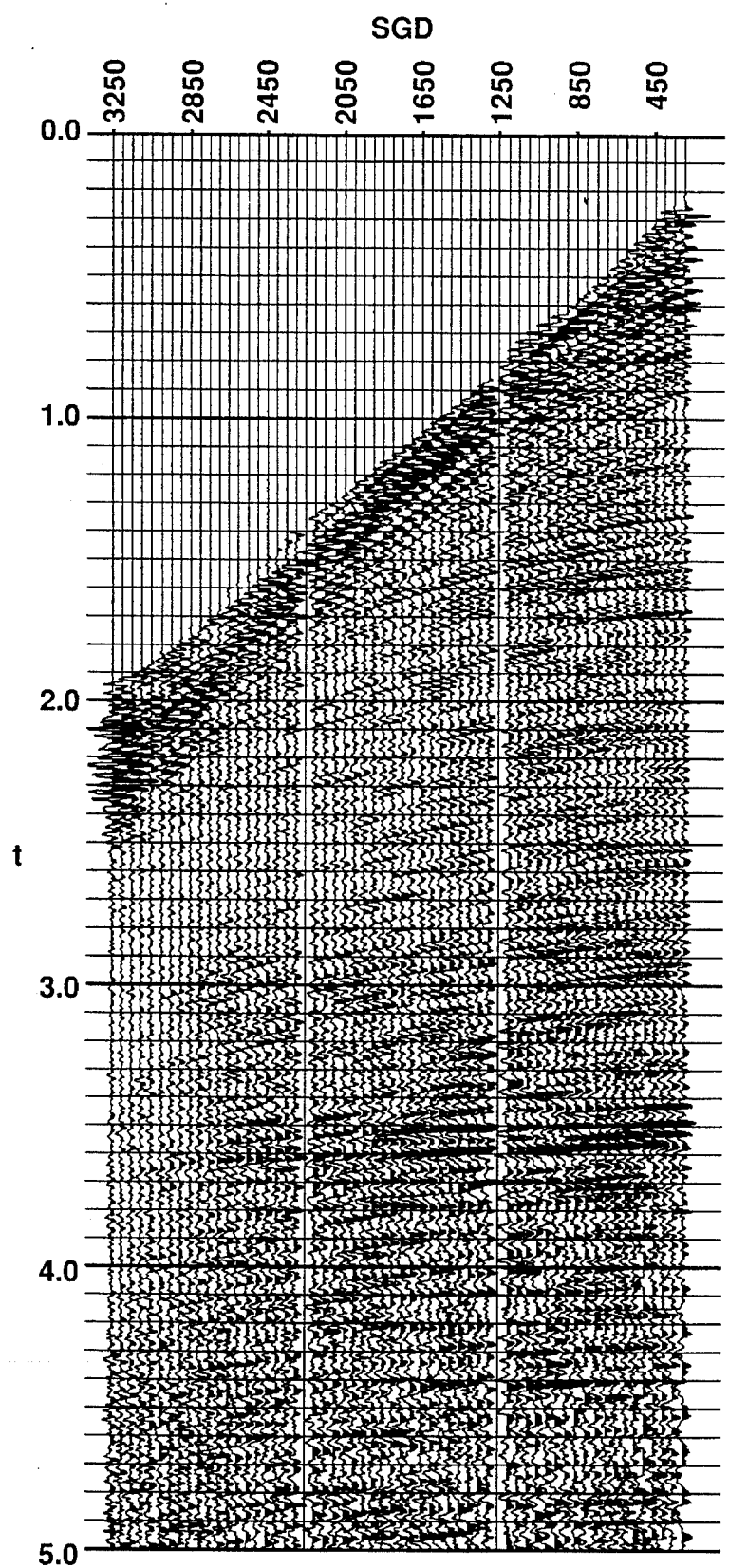
FIG. 6 is an illustration of a CMP gather in the offset domain of sample seismic data as input to the process of FIG. 1.
Figure 7:
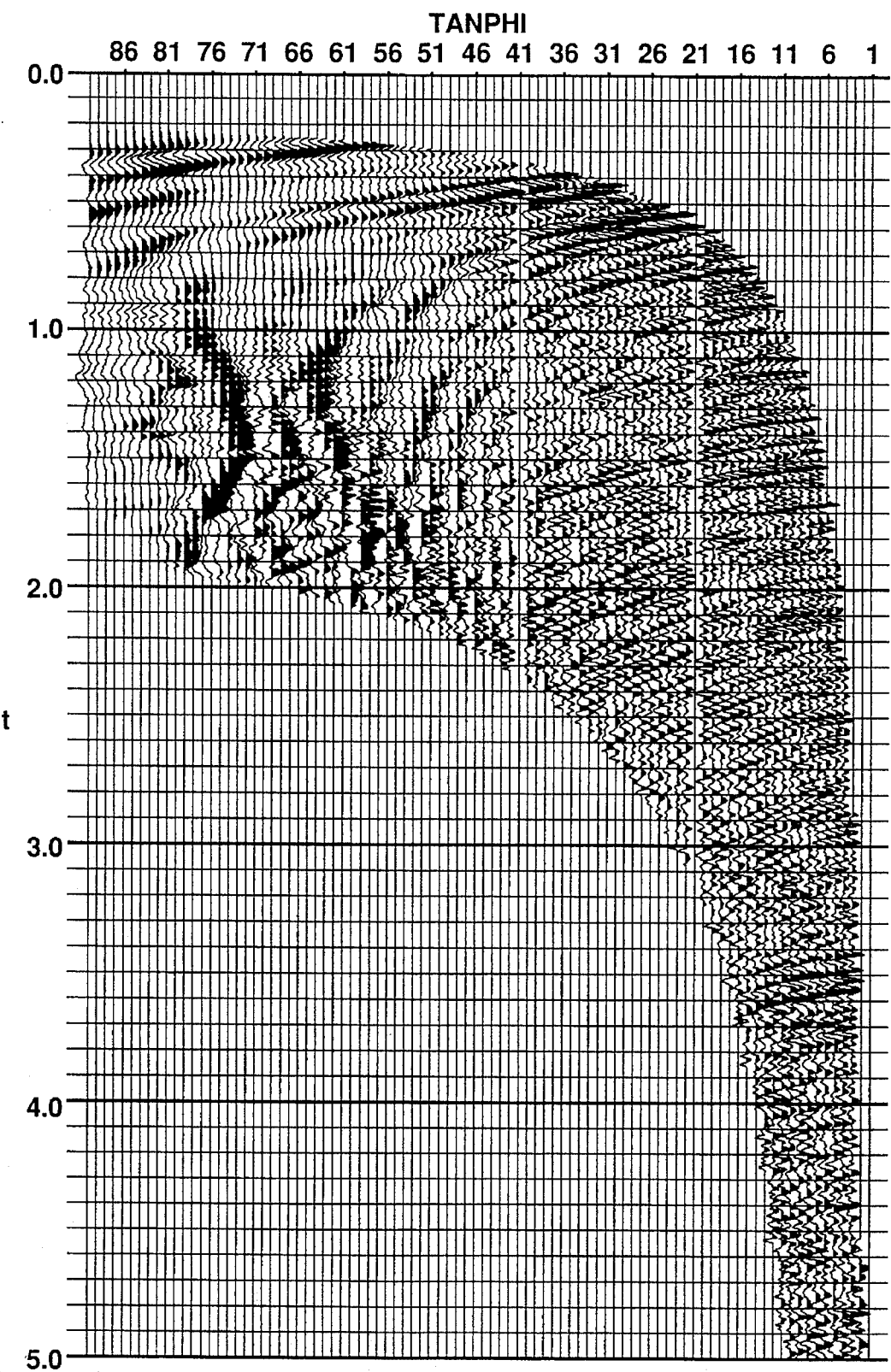
FIG. 7 is an illustration of data of FIG. 6 after conversion to the TANPHI domain to form a CMP gather of constant TANPHI traces.
Figure 8:
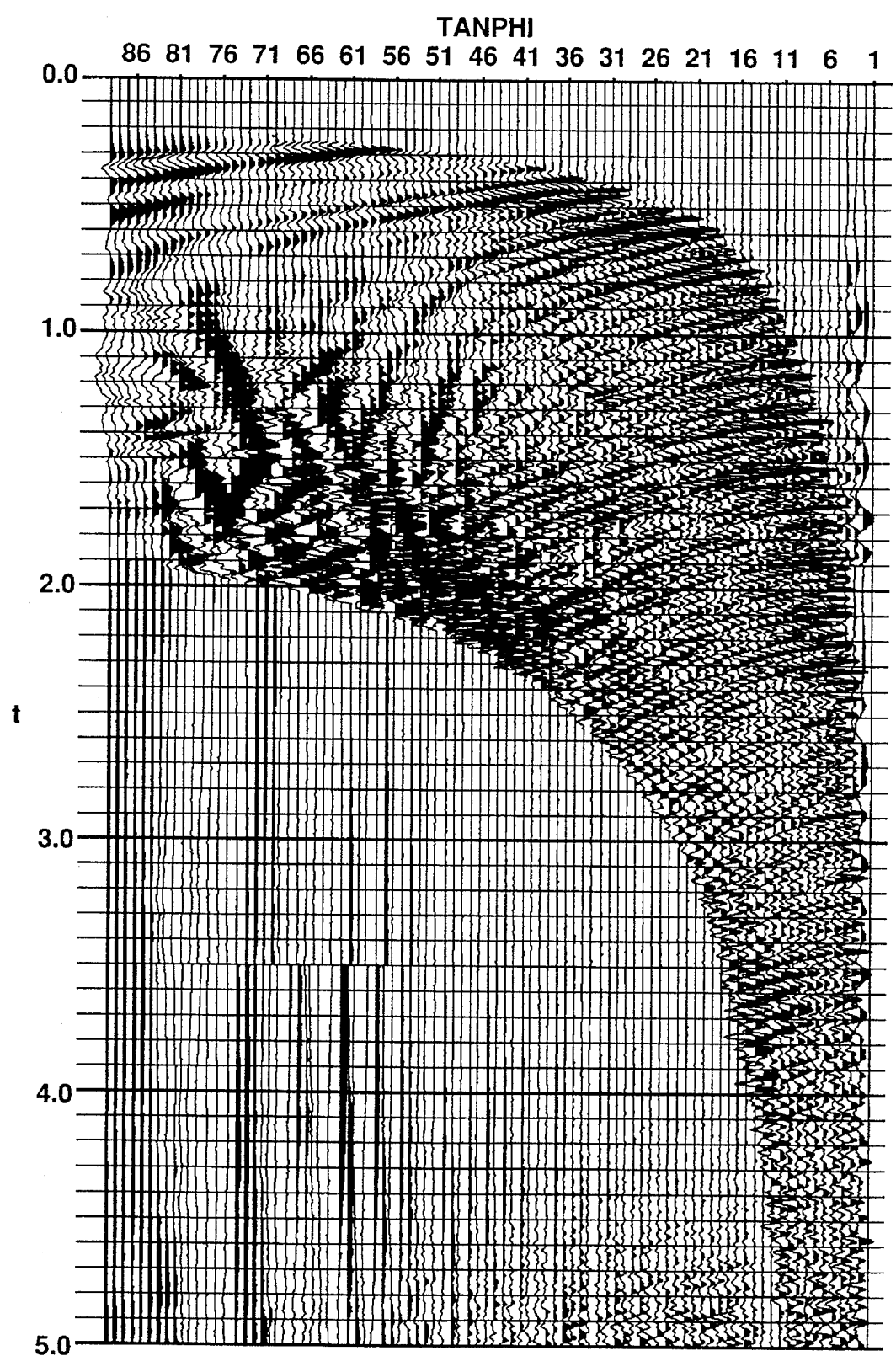
FIG. 8 is an illustration of the CMP gather of FIG. 7 after migration and sorting.
Figure 9:
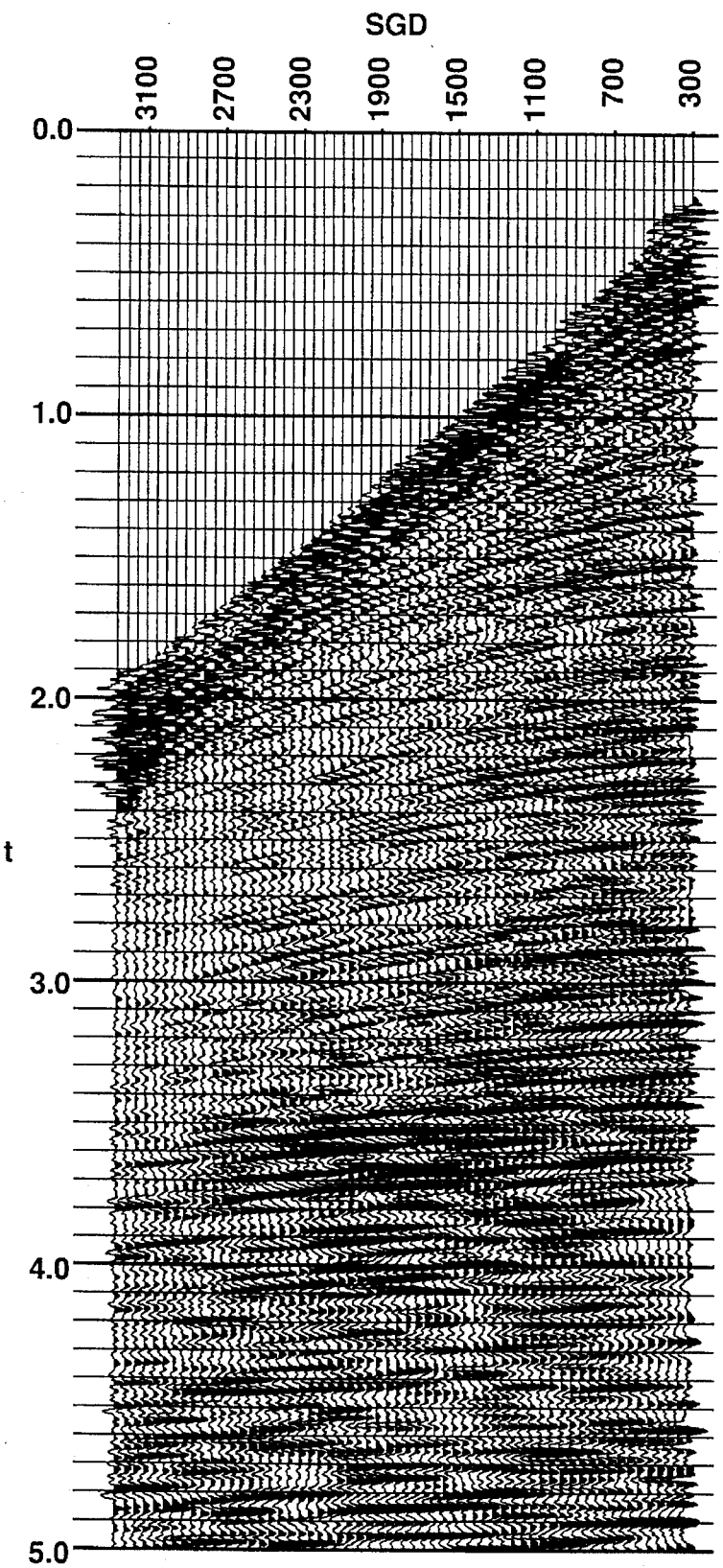
FIG. 9 is an illustration of the CMP gather of FIG. 6 in the offset domain, after migration and after completion of inverse NMO transposition according to the process of FIG. 1.

FIG. 6 illustrates a CMP gather of sample seismic data, as part of the data input to the process 10, at step 14. FIG. 7 shows the data from the CMP gather of FIG. 6, after NMO correction at step 18 and conversion at step 20 to constant TANPHI traces in a CMP gather. FIG. 8 shows the TANPHI traces at the same surface location as FIG. 7 after migration. FIG. 9 shows a CMP gather in the offset domain, formed from data illustrated in FIG. 8, after migration in the TANPHI domain at step 38, after conversion to the offset domain at step 46, and after inverse NMO transposition at step 50.

The present invention thus provides a procedure to be applied to unstacked seismic data, one CMP gather at a time. As a result of the procedure, a CMP gather is transformed into a collection of seismic data traces distinguished by different values of TANPHI, or, $\epsilon$, for migration. The migrated data are transformed back into the offset domain for further processing, including possibly stacking. The present invention provides a technique whereby unstacked seismic data may be migrated without the need for DMO correction prior to migration. It will be appreciated that a common $\epsilon$ section, or common TANPHI section, resembles a common offset section. Each is single-fold and exhibits a relatively low signal-to-noise ratio. A common $\epsilon$ or common TANPHI section is not NMO-corrected, but retains the arrival times of the unstacked data directly as recorded. In two dimensions, a common $\epsilon$ or common TANPHI section may be migrated by any 2-D zero offset migration program. In three dimensions, common $\epsilon$ or common TANPHI data may be migrated by any zero offset 3-D migration program, if crossline distances are rescaled as discussed above. Common $\epsilon$ or common TANPHI data migration provides a preferred alternative to common offset migration.

The foregoing disclosure and description of the invention is illustrative and explanatory thereof, and various changes in the method steps may be made within the scope of the appended claims without departing from the spirit of the invention.

What is claimed is:

1. A method of processing seismic data, comprising the following steps:
   a. acquiring a plurality of CMP gathers of seismic data traces in the offset domain, with each trace of each gather characterized by a specific value of offset SGD; and
   b. converting the seismic data in the CMP gathers to a second domain, defined by a quantity dependent on travel time and the first power of velocity of reflected seismic waves, by:
      i. forming the seismic data in each CMP gather into traces with each trace characterized by a specific value of the quantity defining the second domain; and
      ii. sorting the traces in the second domain into gathers characterized by common values of the quantity defining the second domain;
   c. migrating the seismic data in the gathers of common values of the quantity defining the second domain;
   d. converting the migrated seismic data from the second domain to the offset domain by:
      i. sorting the traces in the second domain into CMP gathers with each CMP gather comprising one or more traces with each trace characterized by a specific value of the quantity defining the second domain; and
      ii. forming the seismic data in each CMP gather into traces with each trace characterized by a specific value of offset SGD.

2. The method of processing seismic data as defined in claim 1 further comprising the step of stacking the migrated seismic data in the CMP gathers in the offset domain.

3. The method of processing seismic data as defined in claim 1 further comprising the step of performing inverse NMO transformations on the seismic data.

4. The method of processing seismic data as defined in claim 3 further comprising the step of performing residual velocity analysis on the migrated seismic data after the inverse NMO transformations are performed.

5. The method of processing seismic data as defined in claim 4 further comprising the step of performing NMO corrections on the seismic data after the residual velocity analysis is performed.

6. The method of processing seismic data as defined in claim 5 further comprising the step of stacking the seismic data.

7. The method of processing seismic data as defined in claim 1 further comprising the step of performing NMO corrections on the acquired seismic data in the offset domain before the step of converting the seismic data to the second domain is performed.

8. The method of processing seismic data as defined in claim 1 wherein the quantity defining the second domain is $\epsilon$, defined by $$\epsilon = SGD/(V_{rms}t)$$

where t is the time assigned to a seismic data sample of a seismic data trace and $V_{rms}$ is the root mean square velocity of that sample at the time t.

9. The method of processing seismic data as defined in claim 1 wherein the quantity defining the second domain is TANPHI, defined by $$TANPHI=SGD/(V_{rms}t_0)$$

where $t_0$ in the spread-corrected time assigned to a seismic data sample of a seismic data trace and $V_{rms}$ is the root mean square velocity of that sample at the time $t_0$.

10. A method of processing seismic data, comprising the following steps:
 a. acquiring a plurality of CMP gathers of seismic data traces in the offset domain, with each trace characterized by a specific value of offset SGD;
 b. performing NMO corrections on the seismic data traces;
 c. converting the seismic data of each CMP gather to seismic data in a CMP gather in the $\epsilon$ domain where $\epsilon$ is defined by $$\epsilon=SGD/(V_{rms}t)$$

where t is the time assigned to a seismic data sample of a seismic data trace and $V_{rms}$ is the root mean square velocity of that sample at the time t, using $$SGD=\epsilon V_{rms}t_0/[1-\epsilon^2]^{1/2}$$

to locate data in the respective CMP gather in the offset domain, where $t_0$ is the spread-corrected time of data samples in the offset domain, and using $$t=t_0/(1-\epsilon^2)^{1/2}$$

to locate times of data samples to form data traces for specific, constant $\epsilon$ values in the $\epsilon$ domain;
 d. sorting the constant $\epsilon$ traces of all the CMP gathers in the e domain into common $\epsilon$ gathers;
 e. migrating the seismic data in the common $\epsilon$ gathers;
 f. sorting the migrated constant $\epsilon$ traces into CMP gathers with each CMP gather comprising constant $\epsilon$ traces for different values of E; and
 g. converting the seismic data of each CMP gather from the $\epsilon$ domain to the offset domain to form a respective CMP gather of traces of constant offset values SGD, by transposing seismic data from the traces of the CMP gather in the $\epsilon$ domain to the offset domain and forming constant offset traces in the respective CMP gather in the offset domain.

11. The method of processing seismic data as defined in claim 10 further comprising the step of stacking the migrated seismic data in the CMP gathers in the offset domain.

12. The method of processing seismic data as defined in claim 10 wherein the step of converting the seismic data of each CMP gather from the offset domain to the $\epsilon$ domain includes interpolating among seismic data in the respective CMP gather in the offset domain to obtain seismic data to transpose to the $\epsilon$ domain to use in forming constant $\epsilon$ traces in the $\epsilon$ domain.

13. The method of processing seismic data as defined in claim 10 wherein the step of converting the seismic data of each CMP gather from the $\epsilon$ domain to the offset domain includes interpolating among seismic data transposed to the respective CMP gather in the offset domain to obtain seismic data to use in forming constant offset traces in the offset domain.

14. A method of processing seismic data, comprising the following steps:
 a. acquiring a plurality of CMP gathers of seismic data traces in the offset domain, with each trace characterized by a specific value of offset SGD;
 b. performing NMO corrections on the seismic data traces;
 c. converting the seismic data of each CMP gather to seismic data in a CMP gather in the TANPHI domain where TANPHI is defined by $$TANPHI=SGD/(V_{rms}t_0)$$

where $t_0$ is the spread-corrected time of data samples of a seismic data trace and $V_{rms}$ is the root mean square velocity of that sample at the time $t_0$, using $$SGD=V_{rms}t_0 TANPHI$$

to locate data in the respective CMP gather in the offset domain, and using $$t=t_0(1+TANPHI^2)^{1/2}$$

to locate times of data samples to form data traces for specific, constant TANPHI values in the TANPHI domain, where t is the time assigned to a seismic data sample of a seismic data trace;
 d. sorting the constant TANPHI traces of all the CMP gathers in the TANPHI domain into common TANPHI gathers;
 e. migrating the seismic data in the common TANPHI gathers;
 f. sorting the migrated constant TANPHI traces into CMP gathers with each CMP gather comprising constant TANPHI traces for different values of TANPHI; and
 g. converting the seismic data of each CMP gather from the TANPHI domain to the offset domain to form a respective CMP gather of traces of constant offset values SGD, by transposing seismic data from the traces of the CMP gather in the TANPHI domain to the offset domain and forming constant offset traces in the respective CMP gather in the offset domain.

15. The method of processing seismic data as defined in claim 14 further comprising the step of stacking the migrated seismic data in the CMP gather in the offset domain.

16. The method of processing seismic data as defined in claim 14 wherein the step of converting the seismic data of each CMP gather from the offset domain to the TANPHI domain includes interpolating among seismic data in the respective CMP gather in the offset domain to obtain seismic data to transpose to the TANPHI domain to use in forming constant TANPHI traces in the TANPHI domain.

17. The method of processing seismic data as defined in claim 14 wherein the step of converting the seismic data of each CMP gather from the TANPHI domain to the offset domain includes interpolating among seismic data transposed to the respective CMP gather in the offset domain to obtain seismic data to use in forming constant offset traces in the offset domain.

* * * * *